United States Patent [19]

Slavens

[11] 4,022,068
[45] May 10, 1977

[54] ADJUSTABLE WELDING HEAD OSCILLATOR

[75] Inventor: Clyde M. Slavens, Houston, Tex.

[73] Assignee: Central Welding Supply Co., Inc., South Houston, Tex.

[22] Filed: Feb. 24, 1975

[21] Appl. No.: 552,133

[52] U.S. Cl. .................................................. 74/54
[51] Int. Cl.² .......................................... F16H 25/08
[58] Field of Search ........................................ 74/54

[56] References Cited

UNITED STATES PATENTS

| | | | |
|---|---|---|---|
| 2,467,199 | 4/1949 | Faeber | 74/54 |
| 3,026,832 | 3/1962 | Taketomi | 74/54 |
| 3,342,395 | 9/1967 | Diedeveen | 74/54 |
| 3,490,060 | 1/1970 | Mazza | 74/54 |
| 3,764,055 | 10/1973 | Nielsen | 74/54 |
| 3,859,495 | 1/1975 | Takahashi et al. | 74/54 |

Primary Examiner—Samuel Scott
Assistant Examiner—Wesley S. Ratliff, Jr.
Attorney, Agent, or Firm—Arnold, White & Durkee

[57] ABSTRACT

An adjustable welding head oscillator in which rotary motion is transformed into sinusoidal reciprocatory motion and transferred to a welding head. A cam follower is adapted for receiving rotary motion from an eccentric arm and translating the rotary motion into sinusoidal reciprocatory motion. The cam follower is mounted on a swing bar having another point along its length connected to the cam follower which is reciprocated with the same amplitude as the cam follower. The welding head is attached to the reciprocating swing bar at selected points along the length of the swing bar. The amplitude of oscillation of the welding head is adjusted by varying the location of the welding head with respect to the swing bar.

13 Claims, 10 Drawing Figures

ADJUSTABLE WELDING HEAD OSCILLATOR

BACKGROUND OF THE INVENTION

This invention relates generally to a novel apparatus for the adjustable oscillation of a welding head. More particularly this invention concerns an apparatus for reciprocating in a sinusoidal path the tip of a welding head electrode.

In the past, it has been common in many carriage mounted automatic welding devices to employ various linkages and other devices to reciprocate the welding head transversely of the welding seam as the automatic welding device proceeds along the seam path. Since it is desirable to employ automatic welding devices in various types of welding operations utilizing a wide range of metals with varying welding characteristics, the amplitude and shape of the electrode path should be capable of easy and rapid adjustment. Many currently existing oscillators cannot be easily adjusted unless the entire welding operation is stopped. Such stops increase operating time and cost. For example, when welding relatively thick pieces of metal it may be desirable to increase the transverse (perpendicular to the welding seam) displacement of the electrode as the metal is built up in the seam. Existing oscillators require extensive adjustment to increase the transverse displacement for each pass along the seam.

It is also desirable to provide for a uniform flow of metal as the electrode is passed across the seam being welded. Many existing oscillators allow the electrode to stop or dwell as it changes direction on its transverse stroke. This results in a metal build up on each edge of the welding seam and prevents a sound uniform weld. This dwelling may also increase the temperature of the welded metals to a point sufficient to change their structural characteristics. A further undesirable characteristic exhibited by some oscillators is a path not symmetric about the centerline of the weld seam causing the tip to spend an unequal time at one side of the weld. This causes unequal heating between the two sides of the seam and may result in poor fusion along the overheated side.

Welding head oscillators have been employed for an extended period of time as depicted in U.S. Pat. No. 3,571,557 to Valentine, U.S. Pat. No. 3,128,368 to Franz et al, U.S. Pat. No. 3,035,156 to Staley, U.S. Pat. No. 2,472,803 to Beyer et al and U.S. Pat. No. 1,933,340 to Raymond.

One advantage of the present invention is to provide a novel welding head oscillator which is capable of providing smooth, uniform movement of the welding head electrode as it moves over the welding seam.

A further advantage of the present invention lies in providing a welding head oscillator whose length of stroke or amplitude may be conveniently and quickly adjusted.

Yet another advantage of the invention is to provide a welding head oscillator which can be adjusted over a wide range of amplitudes and periods in order to accommodate the welding characteristics of various metals.

SUMMARY OF A PREFERRED EMBODIMENT OF THE INVENTION

A welding head oscillator according to a preferred embodiment of the invention includes a rotating eccentric arm, which through a cam follower translates the rotary motion of the eccentric arm into sinusoidal motion of a welding head indirectly coupled to the cam follower. At a point along the cam follower, remote from the cam track, there is attached to the cam follower a swing bar which reciprocates with the full angular amplitude of the cam follower. The swing bar is pivotally mounted at a point spaced from its cam follower attachment point. Being pivotally mounted, the horizontal linear displacement of any point along the swing bar is determined by the distance from the pivot point to the point in question. Thus, the horizontal displacement of the welding head is controlled by coupling it to the swing bar through an adjustable cam roller which is movable along the longitudinal axis of the swing bar, thereby varying the distance from the swing bar pivot point.

The present invention produces an electrode path which is sinusoidal and thus provides a smooth and uniform flow of metal as the electrode is reciprocated across the welding seam. One embodiment of the present invention insures that the electrode does not dwell or stop at the end of each transverse stroke. The amplitude or length of the transverse stroke of the electrode may be conveniently increased or decreased with a simple hand adjustment, which moves the cam roller with respect to a pivot point thereby changing the linear displacement of the electrode.

In the welding situations which do require a dwelling or stopping at the end of each transverse stroke, the present invention may be easily adapted to provide for such dwelling.

It may also be desirable in many situations to provide for the electrode to be oscillated in the orthogonal direction, perpendicular to the surface of the pipe. This type of oscillation allows the welding electrode to maintain a constant distance from the metals being welded when the abutting edges are bevelled or vary the amount of penetration of the weld as the electrode tip passes across the seam. The present invention may be adapted for such orthogonal oscillation.

BRIEF DESCRIPTION OF THE DRAWINGS

So that the present invention may be understood in detail, a more particular description of the invention may be had by reference to the illustrative embodiments shown in the appended drawings, which form a part of this specification. It is to be noted, however, that the drawings illustrate only a typical embodiment of the invention and is not to be considered limiting of its scope, for the invention may admit to other equally effective embodiments.

DETAILED DESCRIPTION OF A PREFERRED EMBODIMENT OF THE INVENTION

Figure 1:
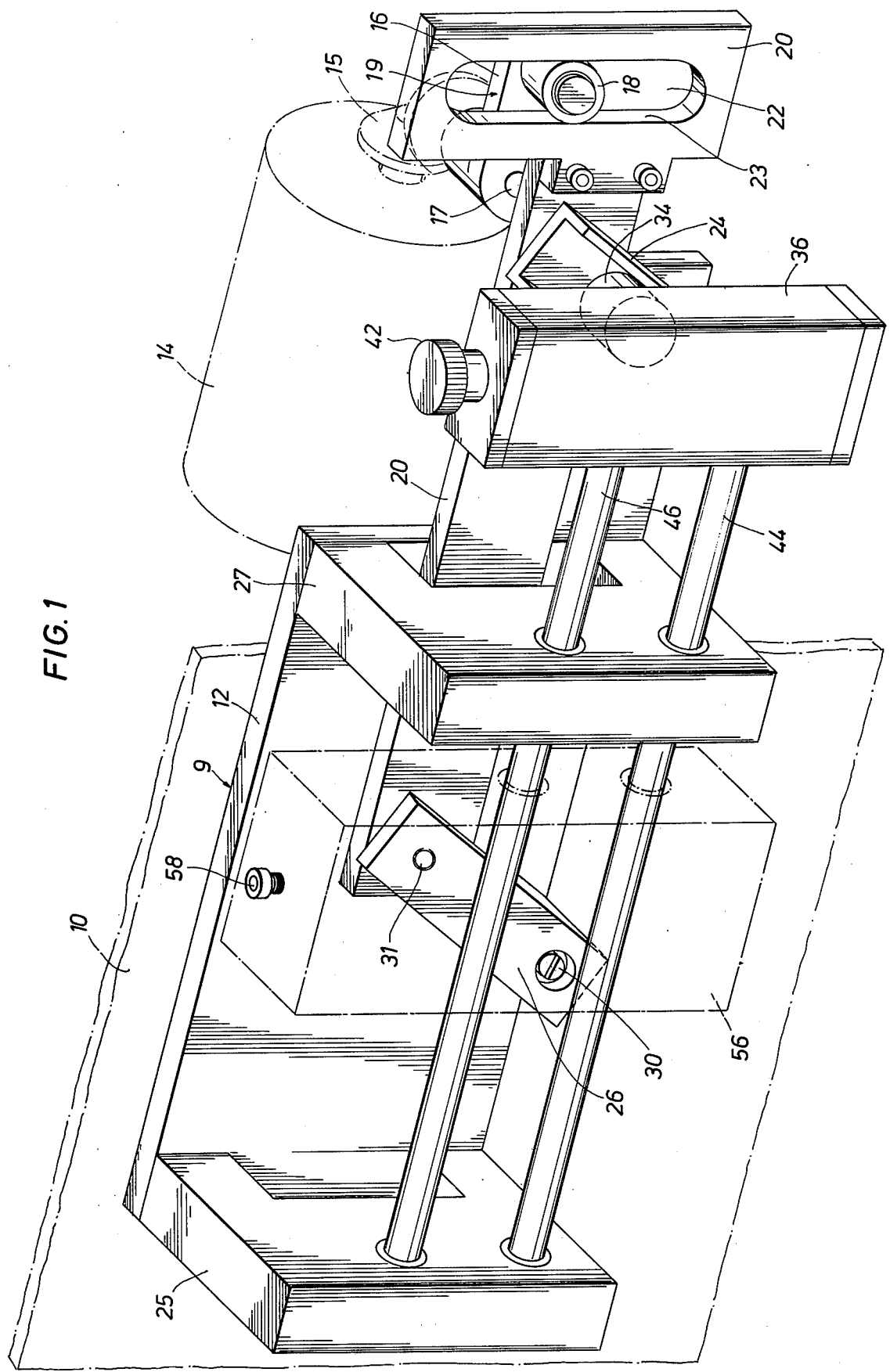
FIG. 1 is a perspective view of the welding head oscillator embodying the features of this invention.
Figure 2:
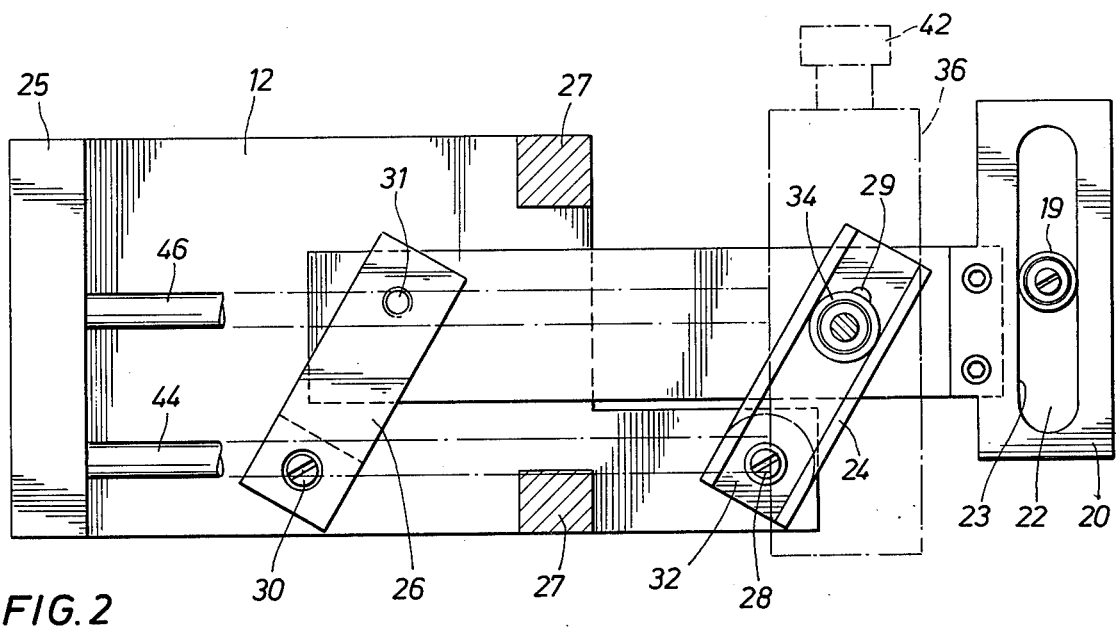
FIG. 2 is a partial elevation view of the oscillator.

In FIGS. 1 and 2 there is illustrated the welding head oscillator, shown generally at 9, mounted onto a member of an automatic welding machine, such as the carriage structure 10. Base plate 12 of the oscillator is attached securely to the carriage 10. A motor 14 that produces the required rotary motion is shown mounted on the carriage 10 adjacent base plate 12. Gear assembly 15 is attached to the motor to transmit the rotary motion to an eccentric arm 16. This eccentric arm is rotated about pivot pin 17, the opposing end having a pivotally mounted transverse roller 18 attached thereto. The assembly of eccentric arm 16 and transverse roller 18 will be considered together as a transverse power cam shown generally at 19.

Although oscillator 9 may be operating in various horizontal or vertical positions with respect to the ground, especially if circular members such as pipes are being welded, the movement of the welding head relative to the seam to be welded can be described in terms of "transverse" and "orthogonal" directions. "Transverse" will describe motion substantially across the line of the welding seam. "Orthogonal" will be used to describe the direction substantially perpendicular to the plane formed by the line of the welding seam and the "transverse" axis, and is perpendicular to the surface of the pipe. When the welding head is moved in the orthogonal direction, the electrode tip is lifted away from or driven toward the welding seam.

With reference to FIG. 2 it can be seen that transverse power cam 19 engages cam follower 20 having an elongated slot 22 forming a cam track 23 within which transverse power cam 19 travels. The rotation of power cam 19 about pivot pin 17 by way of roller 18 travelling in cam track 23 imparts a substantially sinusoidal reciprocating motion to cam follower 20. Cam follower 20 is pivotally mounted to base plate 12 at pivot points 28 and 30 by swing bars 24 and 26 respectively. In the illustrated form of FIGS. 1 and 2, two swing bars 24 and 26 are utilized but it is apparent that one swing bar 26 may be replaced by increasing the length of the cam follower 20 and providing for an enlarged guide slot in guide block 25. Since cam follower 20 is pivotally mounted to swing bars 24 and 26, it reciprocates in an arc about the swing bar pivot points 28 and 30. This arcuate movement prevents cam follower 20 from reciprocating in perfect sinusoidal motion but its motion closely approximates sinusoidal. "Sinusoidal motion" will hereinafter be used to refer to any motion that closely approximates true sinusoidal. True sinusoidal motion of cam follower 20 may be obtained by replacing swing bars 24 and 26 with other types of mountings, such as guide slots. Thus, the rotary motion of transverse power cam 19 transmits sinusoidal transverse reciprocating motion through cam follower 20 to the welding head.

Figure 3:
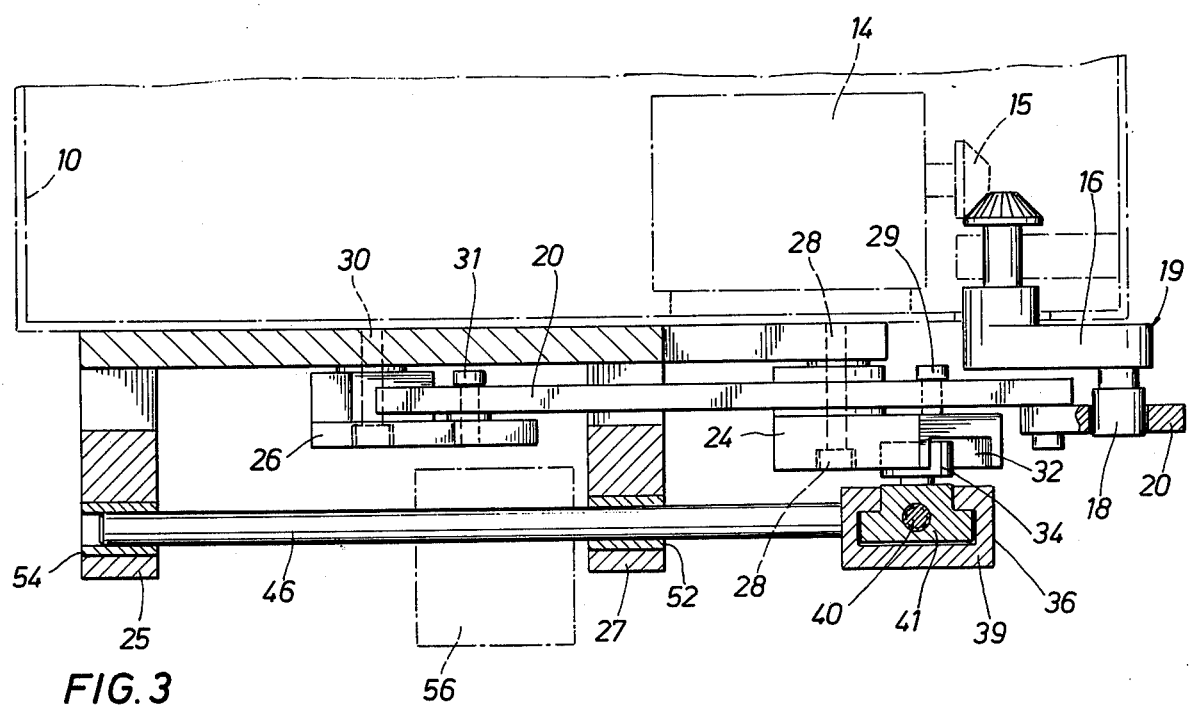
FIG. 3 is a partial plan view of the mechanism for adjusting the position of the welding head along the swing bar.

FIGS. 2 and 3 illustrate a swing cam guide 32 cut into one of the swing bars 24. A swing cam 34 is fitted within this swing cam guide 32 and pivotally connected to transverse adjustment mechanism 36. Mechanism 36 includes swing cam 34 which through cooperation of swing cam 34 and swing bar 24 translates the reciprocating motion of swing bar 24 into sinusoidal reciprocating motion of mechanism 36. This translation is accomplished through movement of swing cam 34 a greater or lesser distance from pivot point 28 along cam guide 32. Mechanism 36 will not move when swing cam 34 is adjusted to a point such that the swing cam 34 is concentric with pivot point 28. Movement of swing cam 34 may be effected through any convenient track or guide assembly. In FIG. 3, a guide assembly which may be employed is illustrated with T-block 41 moving within guide track 39 responsive to rotation of screw shaft 40. The screw shaft 40 is rotated by manually turning the knurled knob 42, (FIG. 1), connected to the screw shaft 40.

Referring to FIG. 3, swing cam 34 fits within the swing cam guide 32 and is transversely reciprocated by the movement of the swing cam guide 32. As screw shaft 40 is rotated and the T-block 41 is moved closer to the pivot pin 28, the amplitude of reciprocatory motion or length of stroke of the welding head is decreased. Thus, by increasing or decreasing the distance between the roller of swing cam 34 and the swing bar pivot point 28, the amplitude of reciprocatory motion of the transverse adjustment mechanism 36 and the welding head connected to it is increased or decreased.

Referring to FIG. 1, adjustment mechanism 36 is fixed to guide rods 44 and 46 which are mounted in guide blocks 25 and 27. The guide rods 44 and 46 allow the adjustment mechanism 36 to reciprocate in sinusoidal motion in the transverse direction.

Mounting block 56 is attached to the guide rods 44 and 46 and has a threaded recess or similar mechanism for securely attaching the welding head thereto. The position of mounting block 56 and the attached welding head with respect to the welding seam may be adjusted by moving mounting block 56 along guide rods 44 and 46. Once the proper relationship exists between the welding seam and the welding head, mounting block 56 may be secured by means of set screw 58.

Figure 4:
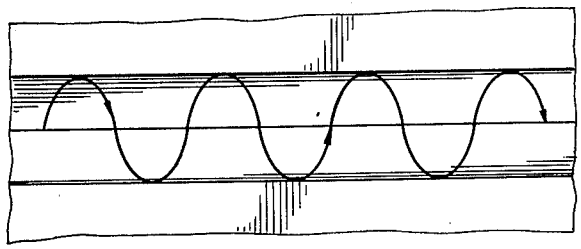
FIG. 4 depicts the sinusoidal electrode path created by the present invention.

The above described embodiment allows the welding head to be reciprocated in the transverse direction only. The welding head and therefore the tip of the welding electrode move with a sinusoidal motion which when combined with the carriage movement describes a sinusoidal path. FIG. 4 illustrates the electrode path generated by the above described invention as the electrode travels in a sinusoidal path along the welding seam. By rotating the screw shaft 40 and increasing the distance between the swing arm pivot point 28 and the roller of swing cam 34 the amplitude of the sinusoidal path may be increased.

Figure 5:
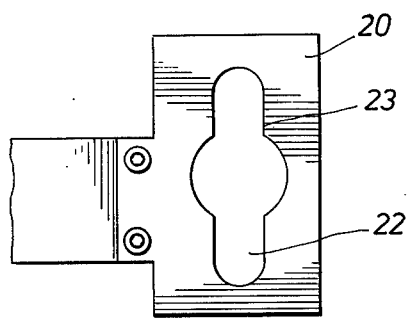
FIG. 5 shows another configuration of the cam track available to be mounted on the cam follower.

It should be noted that it is a feature of the invention to replace the cam track 23 of the cam follower 20 with various shaped tracks to provide a slowing down or dwelling of the motion of the electrode. A dwell may be accomplished by replacing the cam track 23 of FIG. 2 with a track similar to that shown in FIG. 5.

It may be desirable in many welding situations to provide for reciprocating motion in the orthogonal direction. For example, it may be desired to obtain more penetration of the weld near the edges of the seam than at the center due to the variance in thickness of the bevelled edges of the metals to be welded together. This increased penetration can be obtained by decreasing the distance between the electrode tip and the surface to be welded.

Figure 6:
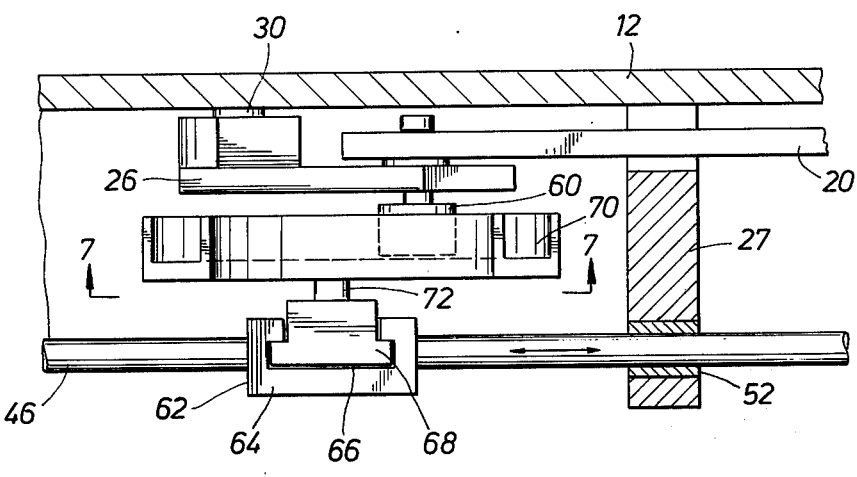
FIG. 6 is a plan view of the mechanism adapted for orthogonal oscillation.
Figure 7:
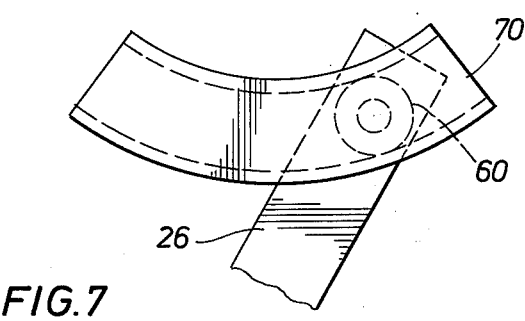
FIG. 7 is a partial elevation view of the orthogonal oscillation mechanism.
Figure 8:
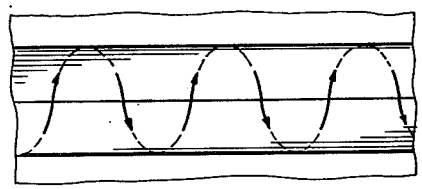
FIGS. 8 and 9 are electrode paths generated by utilizing the orthogonal oscillation mechanism.

Referring to FIGS. 6, 7, and 8, one manner of providing this orthogonal motion is to replace rigid mounting block 56 of FIG. 1 with an assembly comprising an orthogonal power cam 60 mounted on swing bar 26 and an orthogonal mounting block shown generally at 62. Outer guide track 64 is attached to the guide rods 44 and 46 in close proximity to swing bar 26, and contains a longitudinal recess 66 in which a slide block 68 is located. Slide block 68 is allowed to move freely in the orthogonal direction in longitudinal recess 66. Orthogonal power cam guide 70 is connected to slide block 68 through pin 72. Orthogonal power cam 60 fits within orthogonal power cam guide 70 and transmits orthogonal reciprocating motion to slide block 68 as swing bar 26 is reciprocated by cam follower 20. As orthogonal power cam 60 is reciprocated due to the motion of cam follower 20, orthogonal power cam 60 engages orthogonal cam guide 70 forcing it and slide block 68 in an orthogonal direction with respect to guide rods 44 and 46. As can be seen, when cam follower 20 is reciprocated the welding electrode is made to reciprocate in both directions, transverse and orthogonal. The amplitude or length of the orthogonal oscillation will depend upon the shape and position of the orthogonal cam guide 70 with respect to the orthogonal power cam 60.

Figure 9:
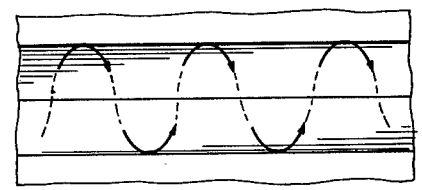

It is apparent that the shape of orthogonal cam guide 70 can be varied to obtain various orthogonal operations. For example, the U-shaped cam guide of FIG. 7 provides an electrode path with greater weld penetration at the center of the seam as shown in FIG. 8 or an inverted U-shaped orthogonal power cam guide would produce a path similar to FIG. 9 with greater penetration along the edges of the seam.

Figure 10:
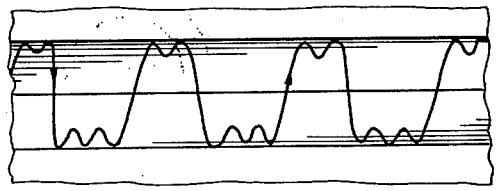
FIG. 10 depicts an electrode path produced by a currently existing oscillator.

It is seen that the present invention imparts a smooth, uniform movement to the welding head electrodes resulting in a sound weld. The path generated by the invention is sinusoidal and summetric about the center line of the seam as seen in FIG. 4. Currently existing oscillators generate electrode paths are irregular in period and do not create a smooth, even metal flow as seen in FIG. 10.

Thus, it is apparent that there has been provided, in accordance with the invention, a welding head oscillator that substantially satisfies the features and advantages set forth above. Although the present invention has been described in conjunction with specific forms thereof, it is evident that many alternatives, modifications and variations will be apparent to those skilled in the art in light of the foregoing disclosure of the invention. Accordingly, it is intended that such alternatives, modifications, and variations may fall within the spirit and scope of the invention as defined in the appended claims be embraced thereby.

I claim:

1. An apparatus for the adjustable oscillation of a welding head mounted thereon, said apparatus comprising:
    a transverse power cam adapted for rotary motion;
    a cam follower engaged by a roller of said power cam, said cam follower adapted for translating the rotary motion of said power cam into reciprocatory motion;
    a swing bar affixed at a point along its length to said cam follower, said swing bar having an end pivotally mounted at a fixed point remote from said cam follower; and
    a transverse adjustment mechanism pivotally and slidably connected to and engaged by said swing bar, said adjustment mechanism adapted for positioning a welding head with respect to said swing bar, to be responsive to the movement of said swing bar, said adjustment mechanism being reciprocated in substantially planar motion.

2. The apparatus for the adjustable oscillation of a welding head as recited in claim 1, wherein said adjustment mechanism includes:
    a guide assembly, and
    a swing cam connected to said guide assembly and engaged by said swing bar to be responsive to reciprocatory motion of said swing bar.

3. The apparatus for the adjustable oscillation of a welding head as recited in claim 2, said guide assembly including:
    a guide track having an elongated recess in close proximity to said swing bar; and
    a screw shaft extending longitudinally through said guide track and track recess, said swing cam connected to said screw shaft and being responsive to rotation of said screw shaft.

4. The apparatus for the adjustable oscillation of a welding head as recited in claim 1, said transverse power cam including:
    an eccentric arm; and
    a transverse roller pivotally connected to said eccentric arm and engaging said cam follower.

5. The apparatus for the adjustable oscillation of a welding head as recited in claim 1, wherein said cam follower includes:
    an elongated bar; and
    a cam track connected to said elongated bar, said cam track being responsive to contact with said transverse power cam.

6. The apparatus for the adjustable oscillation of a welding head as recited in claim 3, including:
    a guide rod connected to said guide track and mounted with respect to a fixed point remote from said cam follower; and
    a mounting block attached to said guide rod and having a recess adapted for mounting said welding head.

7. An apparatus for the adjustable oscillation of a welding head mounted thereon comprising:
    an eccentric arm adapted for rotary motion about one end, said eccentric arm having a roller affixed to its opposing end;
    a cam follower engaged by the roller of said eccentric arm, said cam follower adapted for translating the rotary motion of said eccentric arm into planar sinusoidal reciprocatory motion;
    a swing bar attached at a point along its length to said cam follower, said swing bar having an end pivoted at a fixed point remote from said cam follower;
    a swing cam engaged by said swing bar, said swing cam to be responsive to the movement of said swing bar; and
    a guide assembly connected to said swing cam for adjustably positioning said swing cam with respect to said swing bar, said guide assembly being reciprocated is substantially planar motion.

8. The apparatus for the adjustable oscillation of a welding head as recited in claim 7, said guide assembly comprising:
    a guide track having an elongated recess in close proximity to said swing bar; and
    a screw shaft extending longitudinally through said guide track and track recess, said swing cam connected to said screw shaft and being responsive to rotation of said screw shaft.

9. The apparatus for the adjustable oscillation of a welding head as recited in claim 7, said cam follower comprising:
an elongated bar; and
a cam tract connected to said elongated bar, said cam tract being responsive to contact with the roller of said eccentric arm.

10. The apparatus for the adjustable oscillation of a welding head as recited in claim 9, including:
a guide rod connected to said guide track and mounted with respect to a fixed point remote from said cam follower; and
a mounting block attached to said guide rod and having a recess adapted for mounting said welding head.

11. The apparatus for the adjustable oscillation of a welding head as recited in claim 7, including:
a second swing bar attached at a point along its length to said cam follower, said second swing bar having an end pivoted at a fixed point remote from said cam follower;
an orthogonal power cam connected to said second swing bar; and
an orthogonal assembly engaged by said orthogonal power cam, said orthogonal assembly adapted for adjusting the orthogonal reciprocatory motion of a welding head.

12. The apparatus for the adjustable oscillation of a welding head as recited in claim 11, wherein said orthogonal assembly comprises:
an orthogonal power cam guide engaging said orthogonal power cam, said guide responsive to contact with said orthogonal power cam;
a slide block connected to said orthogonal power cam guide, said slide block having a recess adapted for mounting a welding head; and
a guide track connected to said guide rod, said slide block located within a longitudinal recess of said guide track.

13. An apparatus for the adjustable oscillation of a welding head, said apparatus comprising:
a transverse power cam adapted for rotary motion, said power cam having a roller affixed thereto;
a cam follower engaged by the roller of said power cam, said cam follower having an elongated recess;
a swing bar connected to said cam follower, said swing bar having a first end pivotally mounted at a fixed point remote from said cam follower;
a swing cam engaged by said swing bar, said swing cam to be responsive to the amplitude of oscillation of a plurality of points along said swing bar;
a screw shaft connected to said swing cam, said swing cam being responsive to rotation of said screw shaft;
a guide track having a longitudinal recess, said screw shaft extending longitudinally through said guide track and track recess;
a guide rod connected to said guide track;
a mounting block attached to said guide rod and having a recess adapted for mounting said welding head; and
a guide block mounted with respect to a fixed point remote from said cam follower, said guide rod mounted on said guide block.

* * * * *